United States Patent
Doshi et al.

(10) Patent No.: US 10,970,216 B2
(45) Date of Patent: Apr. 6, 2021

(54) ADAPTIVE GRANULARITY WRITE TRACKING

(71) Applicant: Intel Corporation, Santa Clara, CA (US)

(72) Inventors: Kshitij A. Doshi, Tempe, AZ (US); Francesc Guim Bernat, Barcelona (ES); Daniel Rivas Barragan, Cologne (DE); Suraj Prabhakaran, Aachen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/855,104

(22) Filed: Dec. 27, 2017

(65) Prior Publication Data

US 2019/0034340 A1    Jan. 31, 2019

(51) Int. Cl.
*G06F 12/0831* (2016.01)
*G06F 13/16* (2006.01)
*G06F 16/22* (2019.01)
*G06F 12/02* (2006.01)

(52) U.S. Cl.
CPC ...... *G06F 12/0831* (2013.01); *G06F 12/0238* (2013.01); *G06F 13/1631* (2013.01); *G06F 13/1668* (2013.01); *G06F 16/2237* (2019.01); *G06F 2212/1016* (2013.01); *G06F 2212/1032* (2013.01); *G06F 2212/621* (2013.01); *G06F 2212/7207* (2013.01)

(58) Field of Classification Search
CPC .................................. G06F 12/08; G06F 13/16
USPC .......................................................... 711/146
See application file for complete search history.

(56) References Cited

U.S. PATENT DOCUMENTS

| | | | | |
|---|---|---|---|---|
| 2,757,306 | A * | 9/1973 | Boone | G06F 7/00 340/172.5 |
| 5,577,200 | A * | 11/1996 | Abramson | G06F 9/30043 712/200 |
| 9,058,284 | B1 * | 6/2015 | Ben-Meir | G06F 12/10 |
| 2004/0210588 | A1 * | 10/2004 | Simkins | H04L 61/604 |
| 2010/0169542 | A1 | 7/2010 | Sinclair | |
| 2010/0281204 | A1 | 11/2010 | Yano et al. | |
| 2015/0040111 | A1 * | 2/2015 | Saha | G06F 9/3004 717/153 |
| 2017/0060698 | A1 | 3/2017 | Noe et al. | |

OTHER PUBLICATIONS

Sun Microsystems UltraSPARC Architecture 2005 Draft D0.9.2, Jun. 19, 2008.*

(Continued)

*Primary Examiner* — Mano Padmanabhan
*Assistant Examiner* — John Francis Wojton
(74) *Attorney, Agent, or Firm* — Jordan IP Law, LLC

(57) ABSTRACT

An embodiment of a semiconductor package apparatus may include technology to create a tracking structure for a memory controller to track a range of memory addresses of a persistent memory, identify a write request at the memory controller for a memory location within the range of tracked memory addresses, and set a flag in the tracking structure to indicate that the memory location had the identified write request. Other embodiments are disclosed and claimed.

20 Claims, 5 Drawing Sheets

(56) References Cited

OTHER PUBLICATIONS

Morrison, Donald. PATRICIA—Practical Algorithm to Retrieve Information Coded in Alphanumeric. Journal of the Association for Computing Machinery, vol. 15 No. 4 (Oct. 1968) (Year: 1968).*

Sun Microsystems UltraSPARC Architecture 2005 Draft D0.9.2, Jun. 19, 2008 (Year: 2008).*

"Coherence Write-Behind, Write-Coalescing and Write-Batching", oracle.com/technetwork/middleware/coherence/writebehind-094218.html, retrieved on Dec. 14, 2017, 3 pages.

"IBM Knowledge Center", ibm.com/support/knowledgecenter/SSFKCN/gpfs_welcome.html, 2 pages.

"HDFS Architecture Guide", hadoop.apache.org/docs/r1.2.1/hdfs_design.html, retrieved on Dec. 14, 2017, 7 pages.

"Apache Spark—RDD", tutorialspoint.com/apache_spark/apache_spark_rdd.htm, retrieved on Dec. 14, 2017, 5 pages.

Extended European Search Report for European Patent Application No. 18213777.8, dated May 17, 2019, 10 pages.

* cited by examiner

ADAPTIVE GRANULARITY WRITE TRACKING

TECHNICAL FIELD

Embodiments generally relate to memory systems. More particularly, embodiments relate to adaptive granularity write tracking.

BACKGROUND

Three dimensional (3D) crosspoint memory technology may provide high capacity non-volatile memory (NVM). For example, INTEL OPTANE technology may utilize a combination of 3D XPOINT memory media, memory and storage controllers, and interconnect technology to provide high throughput, low latency, high quality of service, and high endurance in a memory system.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
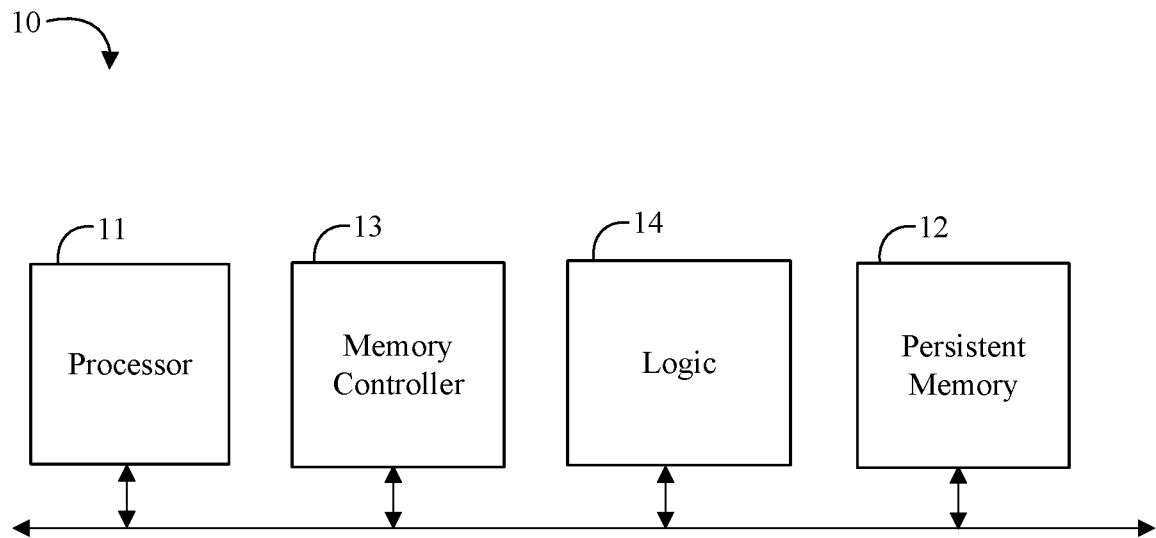
FIG. 1 is a block diagram of an example of an electronic processing system according to an embodiment.

Turning now to FIG. 1, an embodiment of an electronic processing system 10 may include a processor 11, persistent memory 12 communicatively coupled to the processor 11, a memory controller 13 communicatively coupled to the processor 11 and the persistent memory 12, and logic 14 communicatively coupled to the memory controller 13 to create a tracking structure for the memory controller 13 to track a range of memory addresses of the persistent memory 12, identify a write request at the memory controller 13 for a memory location within the range of tracked memory addresses, and set a flag in the tracking structure to indicate that the memory location had the identified write request. For example, the logic 14 may be configured to create the tracking structure based on provided memory address information (e.g., provided from an application, operating system (OS), virtual machine manager (VMM), etc.). In some embodiments, the logic 14 may be configured to create the tracking structure with a bitmap structure, and set a bit in the bitmap structure to indicate that the memory location had the identified write request. For example, the logic 14 may also be configured to create the bitmap structure with a hierarchical bitmap structure.

In some embodiments of the system 10, the logic 14 may be further configured to determine if one or more memory locations corresponding to data moved from the persistent memory 12 to another storage region is within the range of tracked memory locations, and to clear one or more flags in the tracking structure corresponding to one or more memory locations of the moved data determined to be within the range of tracked memory locations. For example, the flag/bit may correspond to a unit of memory having a memory size of a $2^N$ times multiple of a cacheline size, where N is greater than or equal to zero. In some embodiments, the memory controller 13 and/or the logic 14 may be located in, or co-located with, various components, including the processor 11 (e.g., on a same die).

Embodiments of each of the above processor 11, persistent memory 12, memory controller 13, logic 14, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent memory 12, persistent storage media, or other system memory may store a set of instructions which when executed by the processor 11 cause the system 10 to implement one or more components, features, or aspects of the system 10 (e.g., the logic 14, creating a tracking structure for the memory controller 13 to track a range of memory addresses of the persistent memory 12, identifying a write request at the memory controller 13 for a memory location within the range of tracked memory addresses, setting a flag in the tracking structure to indicate that the memory location had the identified write request, etc.).

Figure 2:
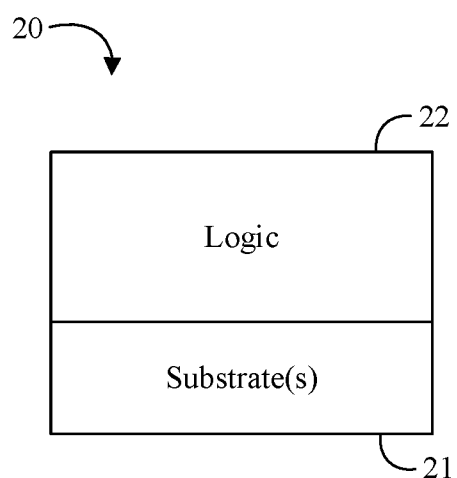
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to create a tracking structure for a memory controller to track a range of memory addresses of a persistent memory, identify a write request at the memory controller for a memory location within the range of tracked memory addresses, and set a flag in the tracking structure to indicate that the memory location had the identified write request. For example, the logic 22 may be configured to create the tracking structure based on provided memory address information. In some embodiments, the logic 22 may be configured to create the tracking structure with a bitmap structure, and set a bit in the bitmap structure to indicate that the memory location had the identified write request. For example, the logic 22 may also be configured to create the bitmap structure with a hierarchical bitmap structure.

In some embodiments of the apparatus 20, the logic 22 may be further configured to determine if one or more memory locations corresponding to data moved from the persistent memory to another storage region is within the range of tracked memory locations, and to clear one or more flags in the tracking structure corresponding to one or more memory locations of the moved data determined to be within the range of tracked memory locations. For example, the flag/bit may correspond to a unit of memory having a memory size of a $2^N$ times multiple of a cacheline size, where N is greater than or equal to zero. In some embodiments, the logic 22 coupled to the one or more substrates 21 may include transistor channel regions that are positioned within the one or more substrates.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), or any of the embodiments discussed herein. The illustrated apparatus 20 includes one or more substrates 21 (e.g., silicon, sapphire, gallium arsenide) and logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
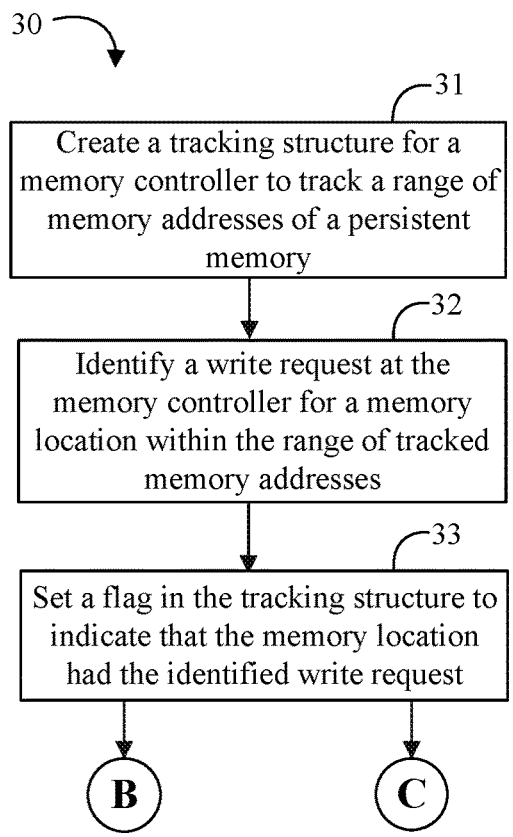
FIGS. 3A to 3C are flowcharts of an example of a method of controlling memory according to an embodiment.
Figure 3C:
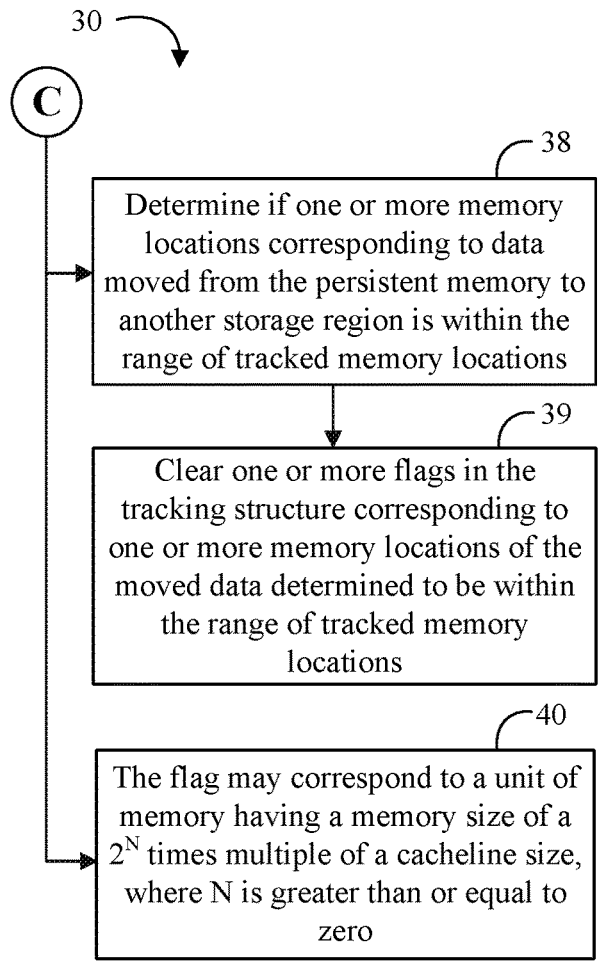
Figure 3B:
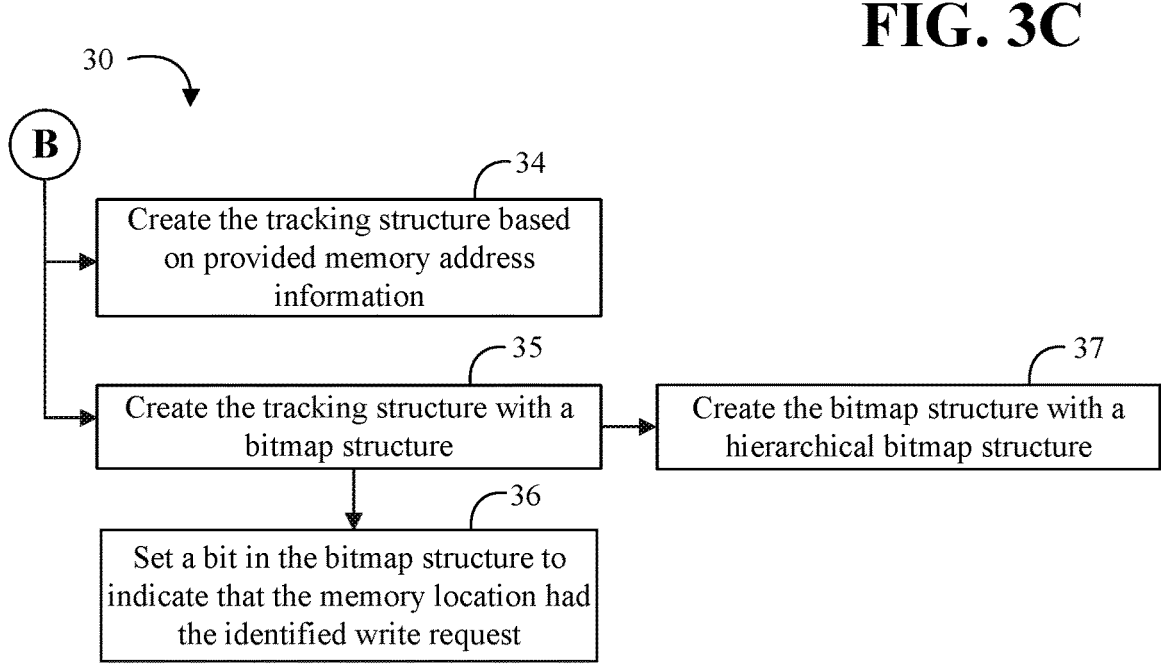

Turning now to FIGS. 3A to 3C, an embodiment of a method 30 of controlling memory may include creating a tracking structure for a memory controller to track a range of memory addresses of a persistent memory at block 31, identifying a write request at the memory controller for a memory location within the range of tracked memory addresses at block 32, and setting a flag in the tracking structure to indicate that the memory location had the identified write request at block 33. For example, the method 30 may include creating the tracking structure based on provided memory address information at block 34. Some embodiments of the method 30 may further include creating the tracking structure with a bitmap structure at block 35, and setting a bit in the bitmap structure to indicate that the memory location had the identified write request at block 36. For example, the method 30 may also include creating the bitmap structure with a hierarchical bitmap structure at block 37. Some embodiments of the method 30 may further include determining if one or more memory locations corresponding to data moved from the persistent memory to another storage region is within the range of tracked memory locations at block 38, and clearing one or more flags in the tracking structure corresponding to one or more memory locations of the moved data determined to be within the range of tracked memory locations at block 39. For example, the flag may correspond to a unit of memory having a memory size of a $2^N$ times multiple of a cacheline size, where N is greater than or equal to zero, at block 40.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Some embodiments may advantageously provide efficient use of huge NVM pages with adaptive granularity write tracking technology. For example, a huge page size may be on the order of a megabyte (MB), a gigabyte (GB), or even a terabyte (TB) page size. Some embodiments may improve or optimize write traffic for various persistent memory technologies including, for example, 3D crosspoint memory technology (e.g., INTEL 3DXPOINT technology), solid-state drive (SSD) technology, and NVM EXPRESS (NVMe) technology.

Some large capacity memory systems (e.g., such as those using non-volatile dual-inline memory modules (NVDIMMs)) may use huge pages (e.g., 2 MB, 1 GB, 1 TB, etc.) to ensure that most dynamic page table entry (PTE) footprints of applications are well contained in the limited translation look-aside buffer (TLB) resources of the processor(s) (e.g., one or more central processor unit (CPU) cores). For example, applications utilizing NVDIMMs may prefer larger page sizes or huge pages to obtain instruction-grained persistence. While data persists in NVM continuously, it is sometimes desirable (e.g., for availability and/or manageability) to copy the data further into another storage medium (e.g., a remote, a movable, transportable, and/or displaceable medium). For example, a database application may need to reflect the data in various storage tiers. In another example, a NVM may be used for read copy sharing in some in-memory computing applications (e.g., such as IBM global parallel file system (GPFS)) with modifications reflected into storage/peer nodes. The replicated data may not necessarily be as intensely accessed in the peer nodes as in the source system, and therefore may not be placed in huge pages or even in memory of the peer node. Another example may include soft consistency applications (e.g., such as ORACLE COHERENCE write-behind protocols), where data may be persisted locally and updated non-synchronously at peers.

For example, a single node may include CPUs which work on objects in a NVM and replicate updates made into the NVM by saving the NVM contents to SSDs from time to time. Another example may be similarly arranged with multiple nodes which do not merely update their NVM based contents in isolation, but also share updates (e.g., via a fast fabric) with one another on a frequent basis. Another example may include disaggregated storage devices that may receive the updates made by the CPUs into NVM memory, and where node-to-node update sharing may proceed both through NVM updates and through the use of such scaleout storage. Another example may include an arrangement in which NVM capacity may be disaggregated. For example, some NVM capacity may be placed in a remote node and provisioned through a software abstraction that may hide the remote nature (e.g., latency) of the memory from the CPUs. After an application modifies a few blocks inside a huge page in the NVM, the application may replicate or move the page back to the SSD or another storage tier. In some other systems, the application may send back all the data in the huge page, which may cause a two or three order of magnitude increase in the write traffic as compared to caching input/output (IO) syscalls such as write/put. Updates to remote NVMs over inter-node fabric or to disaggregated storage tiers may suffer similar increases, affecting path elements (e.g., switches) and host fabric interfaces.

One problem with utilizing huge pages in memory together with storage tiers is that copying the data may cause increased use of storage and/or network bandwidths. Another problem with utilizing huge pages in persistent memory together with storage tiers is that increased write amplification may result from having to copy/reflect huge pages that are modified (e.g., copying or reflecting the modifications into storage or into remote nodes). Increased write amplification may reduce the reliability and/or endurance of the persistent memory devices (e.g., the NVDIMMs). Advantageously, some embodiments may provide technology to reduce or optimize the write traffic associated with huge pages, to reduce the write amplification resulting from copying or reflecting the modifications of huge pages to storage or remote nodes, and/or to improve the reliability and/or endurance of persistent memory devices. Although not limited to persistent memory or huge page sizes, some embodiments may retain the advantages of huge pages while advantageously removing some drawbacks of utilizing huge pages with persistent memory.

In some embodiments, a memory controller may produce a stencil vector (e.g., utilizing a bitmap) to identify writes that have issued against a software specified rangemap. Any suitable structure may be utilized for the software specified rangemap. For example, the software specified rangemap may include a bit-based structure to specify a group of ranges over which modified state tracking is to be performed and the group of ranges may cover one or more huge pages. The unit of tracking is arbitrary, but in some embodiments the unit may be no smaller than a cacheline, and may be some $2^M$ multiple of the cacheline size, where M is greater than or equal to zero. Preferably, the bit-based structure for the rangemap may provide a fine-grained bitmap without complicating the TLBs. Some embodiments may utilize a hierarchical bit structure. Suitable bit-based structures may include a radix-tree rangemap, a parallel bit-page-table, a hash at upper level with bitmaps at lower levels, etc.

In some embodiments, the software specified rangemap may include a radix-sorted group of ranges. Software (e.g., OS, basic input/output system (BIOS), OS middleware, application middleware, cloud middleware, etc.) may construct and provide the rangemap in the form of a radix-tree to the memory controller (e.g., through model specific register (MSR) programming). The radix-tree may be hierarchical, but for most embodiments the hierarchy may not be very deep (e.g., two or three levels may suffice).

Figure 4:
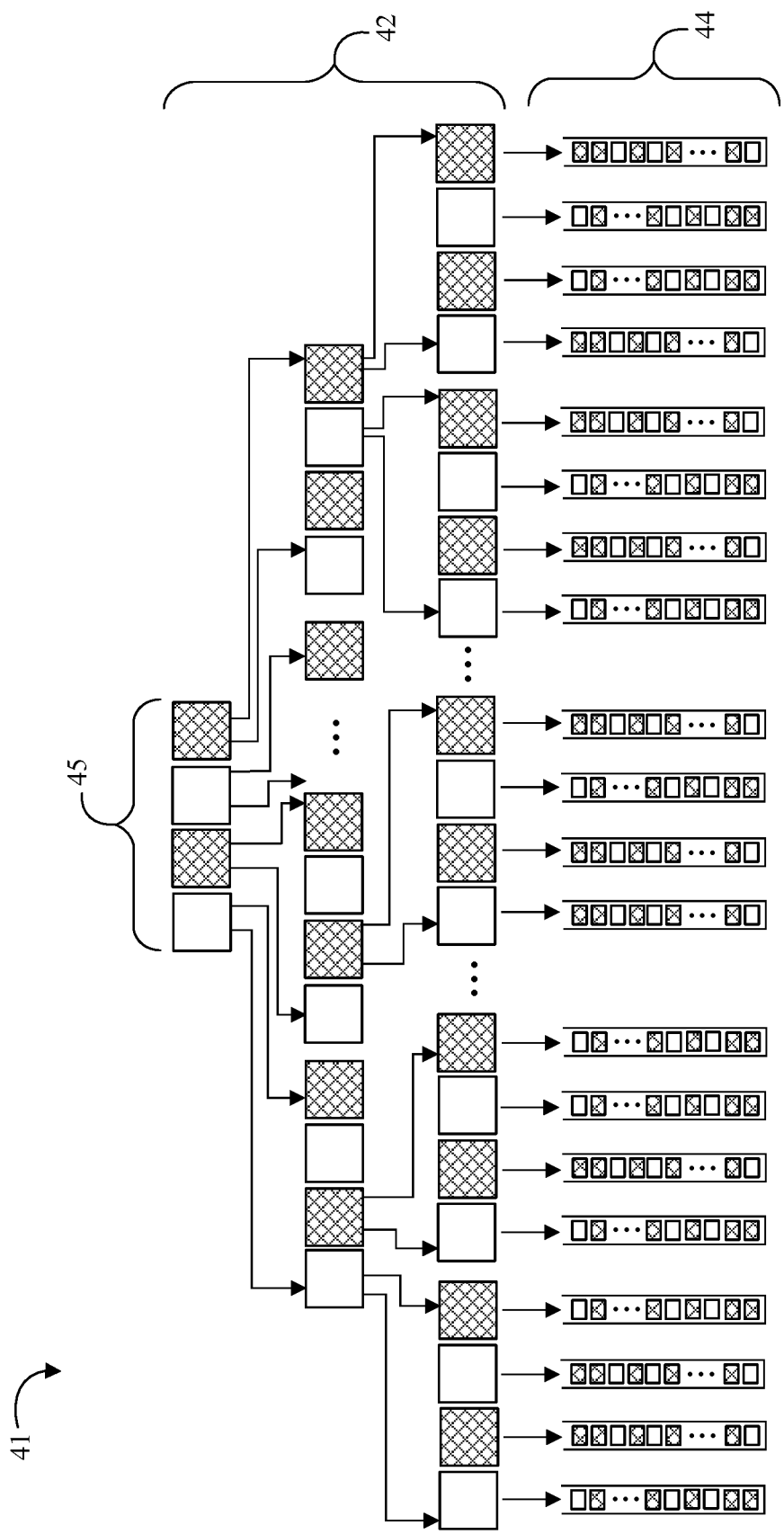
FIG. 4 is an illustrative diagram of an example of a rangemap according to an embodiment.

Turning now to FIG. 4, an embodiment of a rangemap 41 may include a software-provided radix-tree 42 with three levels of hierarchy that resolves to a stencil 44 (e.g., a bitmap vector) which may be updated by a memory controller upon writes to the range specified by the radix-tree 42. A first level 45 of the radix-tree 42 may correspond to a range of cacheline addresses covered by the radix-tree 42. For example, upon receiving a modified cacheline from the CPU(s) (e.g., either due to explicit non-temporal writes, from evictions, cache line write backs (CLWBs), etc.) the memory controller may compute the index into the rangemap 41 and perform a logical OR operation of a logical one (1) with the appropriate bit in the stencil 44 to indicate the cacheline write. For a 512 bit cacheline, for example, at one (1) bit per cacheline the rangemap 41 may about be 512 times smaller than the memory the rangemap 41 covers. The size of the rangemap 41 may be made much smaller by selecting a $2^K$ multiple of cacheline size (e.g., where K is greater than or equal to zero). Some embodiments may configure the rangemap 41 to be one (1) bit per 4K page, which may correspond to a rangemap 41 size of 1/32758 of the NVM capacity. The granularity may be adaptive because the memory controller and/or the software creating the rangemap 41 may select a granularity which is well-suited to the software and/or the page sizes utilized over the range of addresses covered by the rangemap 41. The memory controller may manage multiple such rangemaps having a variety of granularities.

Advantageously, bits that are set to a logical one (1) in this way may earmark smaller areas of a huge page that need to be written to storage or sent to peer nodes, in place of the whole huge page. By moving only the earmarked data instead of the whole page, some embodiments may reduce storage and network bandwidth, may reduce write amplification of the underlying persistent memory technology, and/or may improve the reliability and/or endurance of the underlying persistent memory. Some embodiments may be particularly useful for multi-tier memory or storage architectures with more on-die memory levels, platform and/or data center memories, and/or larger working sets generated by the same application such as database applications, cloud/edge applications, internet-of-things (IoT), etc. Performing the earmarking with the memory controller advantageously may simplify the CPU instruction set and/or the cache microarchitecture (e.g., that might be needed otherwise to achieve comparable advantages). Cache/memory stores may proceed normally and may only be processed through the rangemap check when data needs to go beyond the caches.

Figure 5:
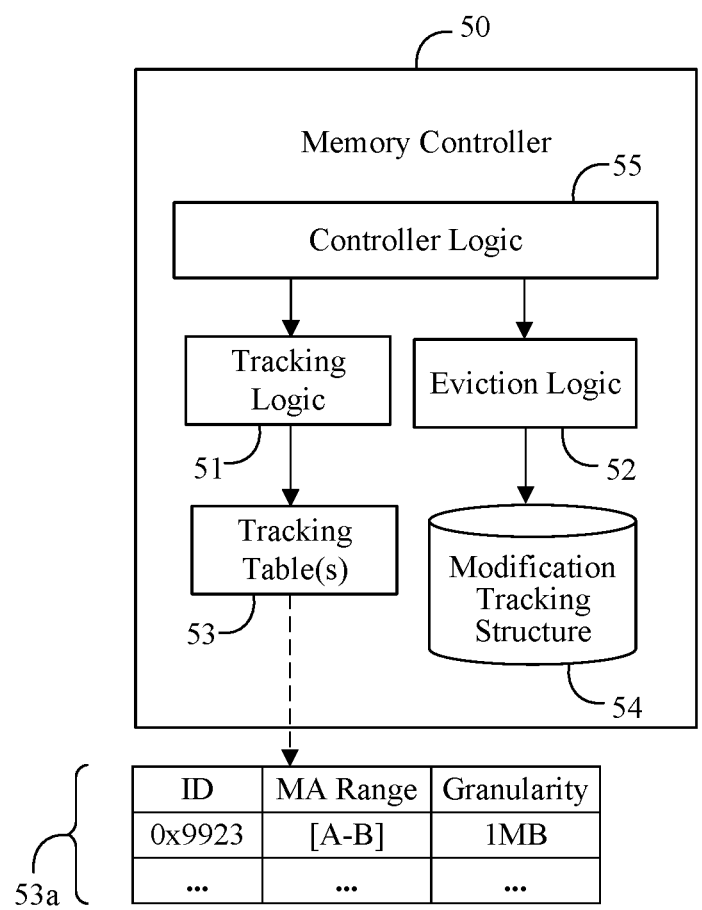
FIG. 5 is a block diagram of an example of a memory controller apparatus according to an embodiment.

Turning now to FIG. 5, an embodiment of a memory controller 50 may include tracking logic 51, eviction logic 52, tracking table(s) 53, a modification tracking structure 54 (e.g., radix-trees, bit-structures, etc.), and other controller logic 55. A tracking table 53a may include one or more table entries with each table entry including a tracker identification, a memory address (MA) range, and a granularity. Each table entry in the tracking table 53a may correspond to a different tracker associated with a memory range. One tracker identification may be associated with a virtual machine or application, and may have multiple entries in the tracking tables 53. The MA range entry in the tracking table 53a may correspond to a physical range or other memory address range associated to that particular tracker. The modification tracking structure 54 may include a set of radix-trees or other tracking structures that may be used by the tracking logic 51 to track changes on the different memory ranges indicated by the tracking tables 53. The tracking logic 51 may track all the different writes coming from the cores to the memory controller 50. For example, writes arriving at the memory controller 50 may be notified to the tracking logic 51. The tracking logic 51 may include a continuously-addressable memory (CAM) structure and may determine if there is any tracker tracking the address range targeted by the write. If so, the tracking logic 51 may update the corresponding modification tracking structure 54 (e.g., radix-tree and stencil or other tracking structure) to earmark that particular chunk of data as modified.

The eviction logic 52 may be configured to move memory ranges from the current memory tier to a next one, including local and/or remote tiers. Advantageously, the eviction logic 52 may be further configured to check the tracking tables 53 and/or the modification tracking structure 54 to move only the chunks of data that have been modified when a large page is to be moved to another tier. The eviction logic 52 may also be configured to clear the corresponding flags/bits in the modification tracking structure 54 after the data is successfully moved. In some embodiments, a system with direct data input/output (DDIO) may flush data toward the memory controller 50 such that the memory controller 50 may perform the needed range tracking, and provide the IO elements with the indication of which chunks of data are to be processed.

Figure 6:
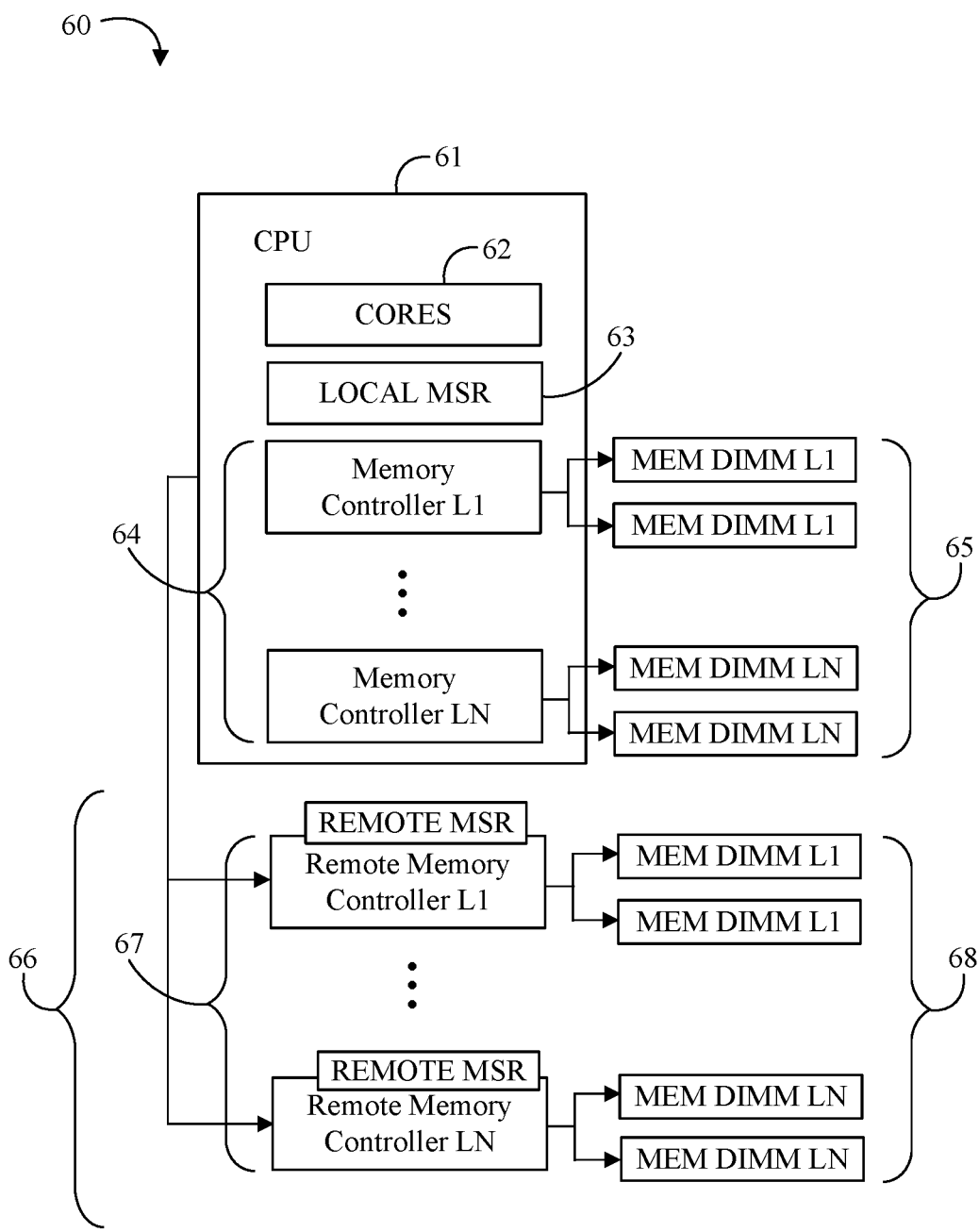
FIG. 6 is a block diagram of an example of a multi-tier memory system according to an embodiment.

Turning now to FIG. 6, an embodiment of a multi-tier memory system 60 may include a local processor 61 having one or more cores 62, a local MSR 63, and two or more local memory controllers 64 respectively coupled to local memory DIMM devices 65. For example, level one (L1) memory devices may be coupled to a local memory controller L1, while local level N (LN) memory devices may be coupled to a local memory controller LN (e.g., where N>1). The local processor 61 may be communicatively coupled (e.g., wired or wirelessly) to one or more pooled or remote memory tiers 66. For example, the remote tiers 66 may include one or more remote memory controllers 67 respectively coupled to remote memory devices 68. Each of the remote memory controllers 67 may include an associated remote MSR. For example, level one (L1) remote memory devices may be coupled to a remote memory controller L1, while remote level N (LN) memory devices may be coupled to a remote memory controller LN (e.g., where N>1).

Each local and remote memory controller L1 through LN may be configured as described above in connection with the memory controller 50 (FIG. 5). The memory controllers 64, 67 may each track the writes that have issued to the respective memory controllers over a software specified rangemap in a hardware stencil (e.g., a bitmap vector) and may move data in chunks which are smaller than the full page size based on the state of corresponding bits in the stencil. The local and remote platforms may expose a set of MSRs to allow each platform to configure the different set of trackers that may be available for each of the memory levels exposed by the local platform. Each time that a given MSR is updated, the corresponding entry in the tracking table may be configured along with the modification tracking structure (e.g., radix-tree, stencil, or other tracking structure).

In some embodiments, software such as middleware may determine the ranges the software wants to track, and also the level of resolution to track within the determined ranges. For example, the software may select the granularity and the range over which sub-page modification state is automatically captured in hardware. The stencils produced by or for the memory controller should ideally be small enough so that the stencils are all contained in last level caches.

Therefore, the software may limit the ranges to a subset of huge pages that are best candidates for such sub-huge-page tracking. In some embodiments, the memory controller may use private areas of system memory as overflow if the stencil maps are larger than the space carved out for the stencil maps from the last level cache.

In some embodiments, the software may direct the stencil and range-map creation through the agency of a platform device driver. For example, the software may also be sufficiently privileged to perform such operations through user-space primitives (e.g., not requiring kernel transitions), if the setup is expected to be frequent. In some embodiments, a software library may perform a gather operation over any range in the rangemap and zero out corresponding bits in the stencil when it has made the needed copy. Any needed synchronization may also be implemented in software, because the software may be aware of when to replicate changes (e.g., perform network or storage IOs). For example, these operations may be performed at a user level through a wrapper around the hardware MSR writers.

Some embodiments may advantageously reduce or avoid write amplification and may also achieve significant savings by performing copies in multiples of cachelines instead of page copies. Some embodiments may advantageously be enabled only for ranges where software is aware of random write accesses that may benefit from such range tracking. Some embodiments may also improve the resiliency of a system. For example, by accelerating the propagation of small writes instead of having to clog up bandwidths with huge page writes, some embodiments may keep the system more nimble in replicating changes across peers and into remote memory pools, and also quick in flushing such changes to local/remote storage.

Some embodiments may be applied to smaller page sizes and/or volatile memory arrangements, but some application software may use huge pages in volatile memory for more transient structures (e.g. JAVA virtual machine (JVM) heaps) or may independently track them for IO scheduling (e.g., database buffer management). Some embodiments may be particularly beneficial for retaining the advantages of huge pages while removing some challenges and overheads of write amplifications for persistent memory. Some embodiments may advantageously provide the ability to discriminate on which write ranges software may perform such range-mapping, such that the software need not range-track over ranges that are not necessary to replicate/flush (e.g., SPARK resilient distributed datasets (RDDs) that may be recomputed from their RDD lineages, volatile JAVA heaps, etc.). Some embodiments may decouple the replication and checkpointing aspects into the granularity that is best suitable, from the load/store aspects best served by large pages.

Additional Notes and Examples

Example 1 may include an electronic processing system, comprising a processor, persistent memory communicatively coupled to the processor, a memory controller communicatively coupled to the processor and the persistent memory, and logic communicatively coupled to the memory controller to create a tracking structure for the memory controller to track a range of memory addresses of the persistent memory, identify a write request at the memory controller for a memory location within the range of tracked memory addresses, and set a flag in the tracking structure to indicate that the memory location had the identified write request.

Example 2 may include the system of Example 1, wherein the logic is further to create the tracking structure based on provided memory address information.

Example 3 may include the system of Example 1, wherein the logic is further to create the tracking structure with a bitmap structure, and set a bit in the bitmap structure to indicate that the memory location had the identified write request.

Example 4 may include the system of Example 3, wherein the logic is further to create the bitmap structure with a hierarchical bitmap structure.

Example 5 may include the system of any Examples 1 to 4, wherein the logic is further to determine if one or more memory locations corresponding to data moved from the persistent memory to another storage region is within the range of tracked memory locations, and clear one or more flags in the tracking structure corresponding to one or more memory locations of the moved data determined to be within the range of tracked memory locations.

Example 6 may include the system of any of Examples 1 to 4, wherein the flag corresponds to a unit of memory having a memory size of a $2^N$ times multiple of a cacheline size, where N is greater than or equal to zero.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to create a tracking structure for a memory controller to track a range of memory addresses of a persistent memory, identify a write request at the memory controller for a memory location within the range of tracked memory addresses, and set a flag in the tracking structure to indicate that the memory location had the identified write request.

Example 8 may include the apparatus of Example 7, wherein the logic is further to create the tracking structure based on provided memory address information.

Example 9 may include the apparatus of Example 7, wherein the logic is further to create the tracking structure with a bitmap structure, and set a bit in the bitmap structure to indicate that the memory location had the identified write request.

Example 10 may include the apparatus of Example 9, wherein the logic is further to create the bitmap structure with a hierarchical bitmap structure.

Example 11 may include the apparatus of any Examples 7 to 10, wherein the logic is further to determine if one or more memory locations corresponding to data moved from the persistent memory to another storage region is within the range of tracked memory locations, and clear one or more flags in the tracking structure corresponding to one or more memory locations of the moved data determined to be within the range of tracked memory locations.

Example 12 may include the apparatus of any of Examples 7 to 10, wherein the flag corresponds to a unit of memory having a memory size of a $2^N$ times multiple of a cacheline size, where N is greater than or equal to zero.

Example 13 may include a method of controlling memory, comprising creating a tracking structure for a memory controller to track a range of memory addresses of a persistent memory, identifying a write request at the memory controller for a memory location within the range of tracked memory addresses, and setting a flag in the tracking structure to indicate that the memory location had the identified write request.

Example 14 may include the method of Example 13, wherein the logic is further to creating the tracking structure based on provided memory address information.

Example 15 may include the method of Example 13, wherein the logic is further to creating the tracking structure with a bitmap structure, and setting a bit in the bitmap structure to indicate that the memory location had the identified write request.

Example 16 may include the method of Example 15, wherein the logic is further to creating the bitmap structure with a hierarchical bitmap structure.

Example 17 may include the method of any Examples 13 to 16, wherein the logic is further to determining if one or more memory locations corresponding to data moved from the persistent memory to another storage region is within the range of tracked memory locations, and clearing one or more flags in the tracking structure corresponding to one or more memory locations of the moved data determined to be within the range of tracked memory locations.

Example 18 may include the method of any of Examples 13 to 16, wherein the flag corresponds to a unit of memory having a memory size of a $2^N$ times multiple of a cacheline size, where N is greater than or equal to zero.

Example 19 may include at least one computer readable medium, comprising a set of instructions, which when executed by a computing device, cause the computing device to create a tracking structure for a memory controller to track a range of memory addresses of a persistent memory, identify a write request at the memory controller for a memory location within the range of tracked memory addresses, and set a flag in the tracking structure to indicate that the memory location had the identified write request.

Example 20 may include the at least one computer readable medium of Example 19, comprising a further set of instructions, which when executed by the computing device, cause the computing device to create the tracking structure based on provided memory address information.

Example 21 may include the at least one computer readable medium of Example 19, comprising a further set of instructions, which when executed by the computing device, cause the computing device to create the tracking structure with a bitmap structure, and set a bit in the bitmap structure to indicate that the memory location had the identified write request.

Example 22 may include the at least one computer readable medium of Example 21, comprising a further set of instructions, which when executed by the computing device, cause the computing device to create the bitmap structure with a hierarchical bitmap structure.

Example 23 may include the at least one computer readable medium of any of Examples 19 to 22, comprising a further set of instructions, which when executed by the computing device, cause the computing device to determine if one or more memory locations corresponding to data moved from the persistent memory to another storage region is within the range of tracked memory locations, and clear one or more flags in the tracking structure corresponding to one or more memory locations of the moved data determined to be within the range of tracked memory locations.

Example 24 may include the at least one computer readable medium of any of Examples 19 to 22, wherein the flag corresponds to a unit of memory having a memory size of a $2^N$ times multiple of a cacheline size, where N is greater than or equal to zero.

Example 25 may include a memory controller apparatus, comprising means for creating a tracking structure for a memory controller to track a range of memory addresses of a persistent memory, means for identifying a write request at the memory controller for a memory location within the range of tracked memory addresses, and means for setting a flag in the tracking structure to indicate that the memory location had the identified write request.

Example 26 may include the method of Example 25, wherein the logic is further to means for creating the tracking structure based on provided memory address information.

Example 27 may include the method of Example 25, wherein the logic is further to means for creating the tracking structure with a bitmap structure, and means for setting a bit in the bitmap structure to indicate that the memory location had the identified write request.

Example 28 may include the method of Example 27, wherein the logic is further to means for creating the bitmap structure with a hierarchical bitmap structure.

Example 29 may include the method of any Examples 25 to 28, wherein the logic is further to means for determining if one or more memory locations corresponding to data moved from the persistent memory to another storage region is within the range of tracked memory locations, and means for clearing one or more flags in the tracking structure corresponding to one or more memory locations of the moved data determined to be within the range of tracked memory locations.

Example 30 may include the method of any of Examples 25 to 28, wherein the flag corresponds to a unit of memory having a memory size of a $2^N$ times multiple of a cacheline size, where N is greater than or equal to zero.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a persistent memory;
a memory controller communicatively coupled to the persistent memory; and
logic communicatively coupled to the memory controller to:
    create a tracking structure for the memory controller to track a range of memory addresses of the persistent memory, wherein the tracking structure comprises a hierarchical bitmap structure with two or more levels of hierarchy, and wherein the two or more levels of hierarchy resolve to one or more bitmap vector stencils when the two or more levels of hierarchy are combined, wherein the tracking structure has a granularity adaptively selected during creation based on page sizes utilized over the range of memory addresses tracked and so that all of the bitmap vector stencils are small enough to all be contained in a last level cache of a processor,
    identify a write request at the memory controller for a memory location within the range of memory addresses tracked, and
    set a flag in the tracking structure to indicate that the memory location had the identified write request.

2. The electronic processing system of claim 1, wherein the logic is further to:
create the tracking structure based on provided memory address information.

3. The electronic processing system of claim 1, wherein the logic is further to:
set a bit in the hierarchical bitmap structure to indicate that the memory location had the identified write request.

4. The electronic processing system of claim 1, wherein the logic is further to:
determine if one or more memory locations corresponding to data moved from the persistent memory to another storage region is within the range of memory addresses tracked; and
clear one or more flags in the tracking structure corresponding to one or more memory locations of the data moved determined to be within the range of memory addresses tracked.

5. The electronic processing system of claim 1, wherein the flag corresponds to a unit of memory having a memory size of a $2^N$ times multiple of a cacheline size, where N is greater than or equal to zero.

6. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
    create a tracking structure for a memory controller to track a range of memory addresses of a persistent memory, wherein the tracking structure comprises a hierarchical bitmap structure with two or more levels of hierarchy, and wherein the two or more levels of hierarchy resolve to one or more bitmap vector stencils when the two or more levels of hierarchy are combined, wherein the tracking structure has a granularity adaptively selected during creation based on page sizes utilized over the range of memory addresses tracked and so that all of the bitmap vector stencils are small enough to all be contained in a last level cache of a processor,
    identify a write request at the memory controller for a memory location within the range of memory addresses tracked, and
    set a flag in the tracking structure to indicate that the memory location had the identified write request.

7. The semiconductor package apparatus of claim 6, wherein the logic is further to:
create the tracking structure based on provided memory address information.

8. The semiconductor package apparatus of claim 6, wherein the logic is further to:
set a bit in the hierarchical bitmap structure to indicate that the memory location had the identified write request.

9. The semiconductor package apparatus of claim 6, wherein the logic is further to:
determine if one or more memory locations corresponding to data moved from the persistent memory to another storage region is within the range of memory addresses tracked; and
clear one or more flags in the tracking structure corresponding to one or more memory locations of the data moved determined to be within the range of memory addresses tracked.

10. The semiconductor package apparatus of claim 6, wherein the flag corresponds to a unit of memory having a memory size of a $2^N$ times multiple of a cacheline size, where N is greater than or equal to zero.

11. A method of controlling memory, comprising:
creating a tracking structure for a memory controller to track a range of memory addresses of a persistent memory, wherein the tracking structure comprises a hierarchical bitmap structure with two or more levels of hierarchy, and wherein the two or more levels of hierarchy resolve to one or more bitmap vector stencils when the two or more levels of hierarchy are combined, wherein the tracking structure has a granularity adaptively selected during creation based on page sizes utilized over the range of memory addresses tracked and so that all of the bitmap vector stencils are small enough to all be contained in a last level cache of a processor;

identifying a write request at the memory controller for a memory location within the range of memory addresses tracked; and setting a flag in the tracking structure to indicate that the memory location had the identified write request.

12. The method of claim 11, wherein the method further comprises:

creating the tracking structure based on provided memory address information.

13. The method of claim 11, wherein the method further comprises:

setting a bit in the hierarchical bitmap structure to indicate that the memory location had the identified write request.

14. The method of claim 11, wherein the method further comprises:

determining if one or more memory locations corresponding to data moved from the persistent memory to another storage region is within the range of memory addresses tracked; and clearing one or more flags in the tracking structure corresponding to one or more memory locations of the data moved determined to be within the range of memory addresses tracked.

15. The method of claim 11, wherein the flag corresponds to a unit of memory having a memory size of a $2^N$ times multiple of a cache line size, where N is greater than or equal to zero.

16. At least one computer readable medium, comprising a set of instructions, which when executed by a computing device, cause the computing device to:

create a tracking structure for a memory controller to track a range of memory addresses of a persistent memory, wherein the tracking structure comprises a hierarchical bitmap structure with two or more levels of hierarchy, and wherein the two or more levels of hierarchy resolve to one or more bitmap vector stencils when the two or more levels of hierarchy are combined, wherein the tracking structure has a granularity adaptively selected during creation based on page sizes utilized over the range of memory addresses tracked and so that all of the bitmap vector stencils are small enough to all be contained in a last level cache of the processor;

identify a write request at the memory controller for a memory location within the range of memory addresses tracked; and set a flag in the tracking structure to indicate that the memory location had the identified write request.

17. The at least one computer readable medium of claim 16, comprising a further set of instructions, which when executed by the computing device, cause the computing device to:

create the tracking structure based on provided memory address information.

18. The at least one computer readable medium of claim 16, comprising a further set of instructions, which when executed by the computing device, cause the computing device to:

set a bit in the hierarchical bitmap structure to indicate that the memory location had the identified write request.

19. The at least one computer readable medium of claim 16, comprising a further set of instructions, which when executed by the computing device, cause the computing device to:

determine if one or more memory locations corresponding to data moved from the persistent memory to another storage region is within the range of memory addresses tracked; and clear one or more flags in the tracking structure corresponding to one or more memory locations of the data moved determined to be within the range of memory addresses tracked.

20. The at least one computer readable medium of claim 16, wherein the flag corresponds to a unit of memory having a memory size of a $2^N$ times multiple of a cacheline size, where N is greater than or equal to zero.

* * * * *